United States Patent
Osaki et al.

(10) Patent No.: US 7,054,100 B2
(45) Date of Patent: May 30, 2006

(54) MAGNETIC TAPE RECORDING/REPRODUCING DEVICE AND MAGNETIC TAPE RECORDING/REPRODUCING SYSTEM

(75) Inventors: Hiroyuki Osaki, Miyagi (JP); Shinichiro Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 10/207,557

(22) Filed: Jul. 29, 2002

(65) Prior Publication Data

US 2003/0035242 A1    Feb. 20, 2003

(30) Foreign Application Priority Data

Aug. 17, 2001  (JP) ............................ 2001-248281

(51) Int. Cl.
*G11B 5/027* (2006.01)
*G11B 15/60* (2006.01)
*G03B 23/06* (2006.01)

(52) U.S. Cl. .................. 360/84; 242/346.2; 360/130.2

(58) Field of Classification Search .................. 360/84, 360/85, 130.2, 130.23; 242/346, 346.1, 346.2
See application file for complete search history.

(56) References Cited

U.S. PATENT DOCUMENTS

| 3,571,524 | A | * | 3/1971 | Kozu et al. .................... 360/69 |
| 3,656,761 | A | * | 4/1972 | Laschenski .............. 360/78.02 |
| 5,283,611 | A | * | 2/1994 | Kobayashi et al. ........... 355/27 |
| 5,883,752 | A | * | 3/1999 | Hirabayashi et al. ......... 360/85 |

* cited by examiner

*Primary Examiner*—A. J. Heinz
(74) *Attorney, Agent, or Firm*—Robert J. Depke; Trexler, Bushnell, Giangiorgi, Blackstone & Marr, Ltd.

(57) ABSTRACT

The present invention is to provide a magnetic tape recording/reproducing device capable of accurately positioning a magnetic tape relative to a magnetic head to thereby improve recording/reproduction characteristics to or from the magnetic tape even when the running direction of the magnetic tape is inverted between forward and reverse directions. First guide rollers are provided so as to swing between a first inclined position and a second inclined position along a tangential direction of the magnetic tape partially wound on roller portions and, where the first inclined position is such that allowing upper flanges to reside on an upstream side of the lower flanges in the tape running direction, and the second inclined position is such that allowing the upper flanges to reside on a downstream side of the lower flanges in the tape running direction. The first guide rollers are respectively provided with drive means for allowing the first guide rollers to swing between the first and second inclined positions.

28 Claims, 14 Drawing Sheets

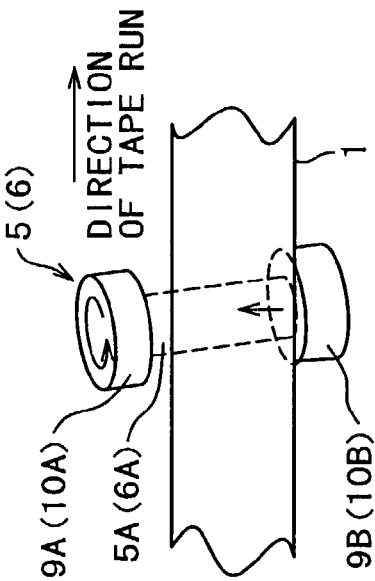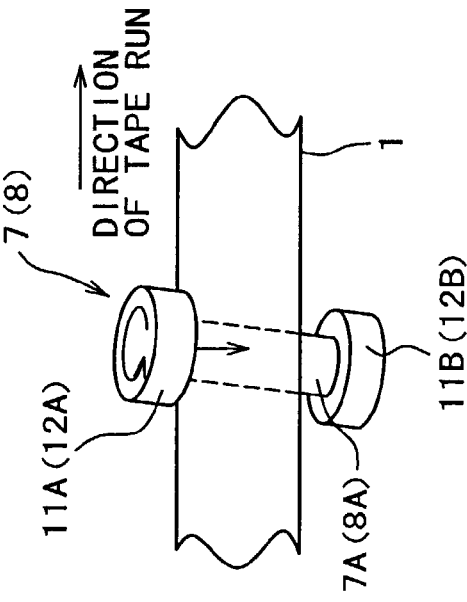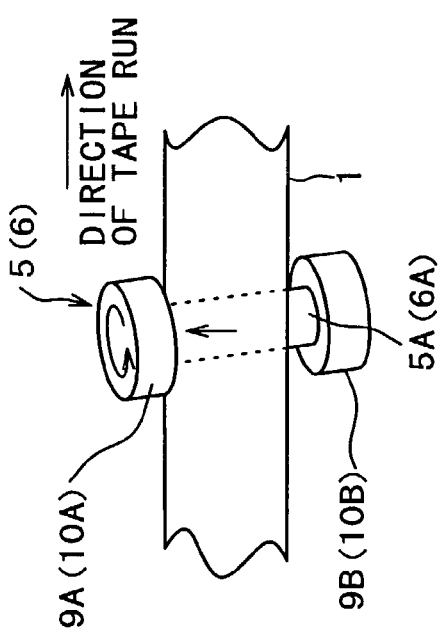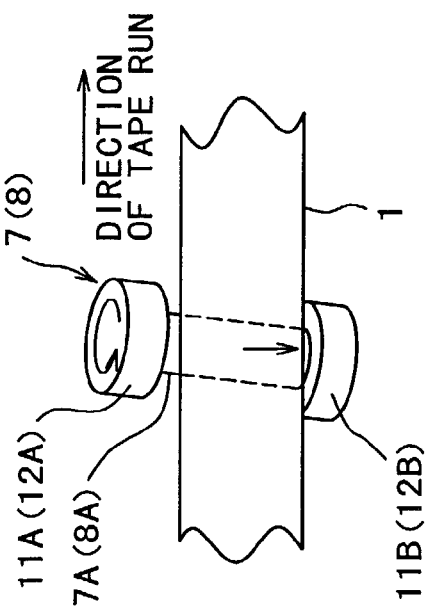

FIG. 13

| SAMPLE A | AUSTENITIC STAINLESS STEEL HAVING DEPOSITED THEREIN MnS INTERMETALLIC COMPOUND BUT CONTAINING NO Cu |
|---|---|
| SAMPLE B | AUSTENITIC STAINLESS STEEL HAVING DEPOSITED THEREIN MnS INTERMETALLIC COMPOUND AND CONTAINING Cu ONLY IN PORTION OTHER THAN MnS DEPOSITED PORTION |
| SAMPLE C | AUSTENITIC STAINLESS STEEL HAVING DEPOSITED THEREIN MnS INTERMETALLIC COMPOUND AND CONTAINING Cu IN MnS DEPOSITED PORTION |
| SAMPLE D | ALUMINUM ALLOY (A5052) |

TAPE-TRAVEL DISTANCE

TAPE-TRAVEL DISTANCE

F1: STATIC FRICTION FORCE
F2: CONTACT (COMPRESSIVE)
    FORCE AGAINST FLANGE
F3: BUCKLING STRENGTH OF TAPE

MAGNETIC TAPE RECORDING/REPRODUCING DEVICE AND MAGNETIC TAPE RECORDING/REPRODUCING SYSTEM

CROSS REFERENCES TO RELATED APPLICATIONS

The present invention claims priority to its priority documents No. 2001-248281 filed in the Japanese Patent Office on Aug. 17, 2001 the entire contents of which being incorporated by reference herein.

BACKGROUND OF THE INVENTION

1. Field of the Invention

The present invention relates to a magnetic tape recording/reproducing device and a magnetic tape recording/reproducing system.

2. Description of the Related Art

FIG. 16 is a schematic drawing of a constitution of a conventional magnetic tape recording/reproducing device having a rotary head.

As shown in FIG. 16, the magnetic tape recording/reproducing device has a stationary drum 3, a rotary drum 3A installed thereon, and a magnetic head 2 mounted on the rotary drum 3A. On an outer peripheral surface of the stationary drum 3, a lead 4 for guiding running of the magnetic tape 1 is provided.

On an upstream side and a downstream side along the tape running direction across the rotary drum 3A, a pair of stationary guides 3B, 3C; a pair of first guide rollers 5, 6; and a pair of second guide rollers 7, 8 are respectively provided.

Each of the first guide rollers 5, 6 comprises a roller portion which rotates as being coupled with motion of the magnetic tape 1 which runs as being partially wound thereon, and unrotative flanges 9, 10 respectively provided on the top portions of the roller portions so as to restrict the upper edge of the magnetic tape 1.

Each of the second guide rollers 7, 8 comprises a roller portion which rotates as being coupled with motion of the magnetic tape 1 which runs as being partially wound thereon, and unrotative flanges 11, 12 provided on the bottom portions of the roller portions so as to restrict the lower edge of the magnetic tape 1.

The magnetic tape 1 runs while the upper edge thereof being restricted by the flanges 9, 10 of the first guide rollers 5, 6, the lower edge thereof being restricted by the flanges 11, 12 of the second guide rollers 7, 8, and the lower edge thereof also being guided by the lead 4 of the stationary drum 3. This allows the magnetic head 2 to trace correct tracks on the magnetic tape 1.

The restriction for the magnetic tape 1 by the first guide rollers 5, 6 and second guide rollers 7, 8 will be detailed below.

As shown in FIG. 17A, the first guide rollers 5, 6 are arranged so that the roller portions thereof are inclined slightly towards the upstream side away from the direction orthogonal to the running direction F of the magnetic tape 1. The magnetic tape 1 will have applied thereon force "A" along the spirally drifting direction effected through static friction force generated in relation with the outer peripheral surface of the roller portions, and position of the magnetic tape 1 can thus successfully be restricted while making the upper edge thereof contact with the flanges 9, 10 of the first guide rollers 5, 6.

Also as shown in FIG. 17B, the second guide rollers 7, 8 are arranged so that the roller portions thereof are inclined slightly towards the downstream side away from the direction orthogonal to the running direction F of the magnetic tape 1. The magnetic tape 1 will have applied thereon force "B" along the spirally drifting direction effected through static friction force generated in relation with the outer peripheral surface of the roller portions, and position of the magnetic tape 1 can thus successfully be restricted while making the lower edge thereof contact with the flanges 11, 12 of the second guide rollers 7, 8.

However in the conventional magnetic tape recording/reproducing device as described in the above, recording or reproduction in the reverse running direction of the magnetic tape 1 undesirably moves the magnetic tape 1 so as to separate the upper edge thereof in a direction departing from the flanges 9, 10 of the first guide rollers 5, 6 since the direction of the spirally drifting force exerted on the magnetic tape 1 will be inverted from the direction indicated by arrow "A" as shown in FIG. 17A.

Similarly, the direction of the spirally drifting force exerted on the magnetic tape 1 will be inverted from the direction indicated by arrow "B" as shown in FIG. 17B, which undesirably moves the magnetic tape 1 so as to separate the lower edge thereof in a direction departing from the flanges 11, 12 of the second guide rollers 7, 8.

This has been raising a problem that the magnetic tape 1 fluctuates up and down due to positioning failure of the upper and lower edges thereof, which adversely affects the tracking on the magnetic tape 1 to thereby degrade recording/reproduction characteristics to or from the magnetic tape 1.

The upper or lower edge of the magnetic tape 1 is pressed to the flange 9, 10, 11 or 12 during running of the magnetic tape 1 in the direction "F", and the portion around the upper or lower edge is compressed as being affected by reaction force from the flanges.

As shown in FIG. 18A, when compressive force $F_2$ exceeds maximum static friction force $F_1$ expressed between the magnetic tape 1 and the outer peripheral surface of the roller potion, the magnetic tape 1 slips on the outer peripheral surface of the roller portion to be pushed back downward or upward, to thereby release the compressive force $F_2$.

On the contrary as shown in FIG. 18B, when the compressive force $F_2$ exceeds the buckling strength $F_3$ of the magnetic tape 1 before the compressive force $F_2$ exceeds the maximum static friction force $F_1$ to thereby induce the sliding, the magnetic tape 1 buckles at the upper or lower edge portion to thereby cause damage. This undesirably narrows the tape width and causes flotation of the lower edge of the magnetic tape 1 from the lead 4 to thereby obstruct accurate and stable tracking.

The damaged magnetic tape 1 also deforms and rises at the edge thereof to thereby prevent itself from being brought into close contact with the rotary drum 3A, where a space generated between the magnetic tape 1 and magnetic head 2 is causative of output attenuation in the output.

Even if the buckling of the magnetic tape 1 should not occur, the upper edge or lower edge of the magnetic tape 1 can be damaged due to pressing to the flange 9, 10, 11 or 12, which may be causative of dropping of the magnetic powder, which will introduce drop-out (local omission of signals) or head clogging (signal attenuation caused by space generation due to adhered powder of worn tape onto the magnetic head).

Moreover, even if the upper edge or lower edge of the magnetic tape 1 should exempt from the damage, the edges may be compressed by being pressed to the flange 9, 10, 11 or 12 by an excessive force, which may degrade accuracy in the positional regulation of the magnetic tape 1 on the magnetic head 2, and may adversely affect the tracking on the magnetic tape 1.

These problems will become more distinct as the magnetic tape is further thinned with increase of recording density.

SUMMARY OF THE INVENTION

The present invention is proposed considering the above situation, and is intended for providing a magnetic tape recording/reproducing device capable of accurately position a magnetic tape relative to a magnetic head to thereby improve recording/reproduction characteristics to or from the magnetic tape even when the running direction of the magnetic tape is inverted between forward and reverse directions.

The present invention is also intended for providing a magnetic tape recording/reproducing device and a magnetic tape recording/reproducing system capable of improving recording/reproduction characteristics to or from the magnetic tape without causing damage on the edges thereof, and of advantageously using a thinned magnetic tape.

A magnetic tape recording/reproducing device according to a first aspect of the present invention intended for solve the foregoing problems is such that comprising a magnetic head for effecting recording and/or reproduction to or from a magnetic tape, and a pair of guide rollers for guiding the magnetic tape partially wound thereon, which are respectively provided on an upstream side and a downstream side along a tape running direction placing the magnetic head in between. In the device, each of the guide rollers comprises a roller portion which rotates as being coupled with motion of the magnetic tape and a flange provided to the roller portion. Each of the guide rollers is provided so as to swing between a first inclined position which inclines along a tangential direction of the magnetic tape partially wound on the roller portion and a second inclined position which inclines in the direction opposite to the first inclined position. Each of the guide rollers is swung to the first inclined position during forward running of the magnetic tape from the upstream side to the downstream side so as to energize the magnetic tape along a direction of one of both edges of the magnetic tape, and each of the flanges comes into contact with one edge of the magnetic tape so as to position the magnetic tape in a width-wise direction thereof. On the other hand, each of the guide rollers is swung to the second inclined position during reverse running of the magnetic tape from the downstream side to the upstream side so as to energize the magnetic tape on one of both edges of the magnetic tape, and each of the flanges comes into contact with one edge of the magnetic tape so as to position the magnetic tape in the width-wise direction thereof.

Thus according to the first aspect of the present invention, the guide rollers can be swung either to the first or second inclined position depending on whether the running direction of the magnetic tape is forward or reverse. This arrangement allows the roller portion to energize the magnetic tape along the direction of one of both edges thereof, and allows the flange to come into contact with one edge of the magnetic tape so as to position the magnetic tape in the width-wise direction thereof.

A second aspect of the present invention relates to a magnetic tape recording/reproducing device comprising a magnetic head for effecting recording and/or reproduction to or from a magnetic tape, and a pair of guide rollers for guiding the magnetic tape partially wound thereon, which are respectively provided on the upstream side and downstream side along the tape running direction placing the magnetic head in between. In the device, each of the guide rollers comprises a roller portion which rotates as being coupled with motion of the magnetic tape, and a flange provided to the roller portion. Each of the guide rollers is provided so as to be inclined along a tangential direction of the magnetic tape partially wound on the roller portion so as to energize the magnetic tape along the direction of one of both edges of the magnetic tape. Each of the flanges comes into contact with one edge of the magnetic tape so as to position the magnetic tape in the width-wise direction thereof, and the foregoing roller portion being composed so as to have a static friction coefficient with the magnetic tape of 0.4 or below.

The second aspect of the present invention can successfully reduce maximum static friction force which may appear between the magnetic tape and the outer peripheral surface of the roller portion. This makes it easier for the magnetic tape to slip on the outer peripheral surface of the roller portion, which means the magnetic tape is readily pushed back downward or upward if the edge thereof is pressed to the flange and compressed to thereby reduce the force by which the edge of the magnetic tape is pressed to the flange.

A third aspect of the present invention relates to a magnetic tape recording/reproducing system comprising a magnetic tape and a magnetic tape recording/reproducing device, which magnetic tape recording/reproducing device comprising a magnetic head for effecting recording and/or reproduction to or from a magnetic tape, and a pair of guide rollers for guiding the magnetic tape partially wound thereon, which are respectively provided on the upstream side and downstream side along the tape running direction placing the magnetic head in between. In the system, each of the guide rollers comprises a roller portion which rotates as being coupled with motion of the magnetic tape, and a flange provided to the roller portion. Each of the guide rollers is provided so as to be inclined along a tangential direction of the magnetic tape partially wound on the roller portion so as to energize the magnetic tape along the direction of one of both edges of the magnetic tape. Each of the flanges comes into contact with one edge of the magnetic tape so as to position the magnetic tape in the width-wise direction thereof. In addition, the each of the roller portions is composed so as to have a static friction coefficient with the magnetic tape of 0.4 or below.

The third aspect of the present invention can successfully reduce maximum static friction force which may appear between the magnetic tape and the outer peripheral surface of the roller portion. This makes it easier for the magnetic tape to slip on the outer peripheral surface of the roller portion, which means the magnetic tape is readily pushed back downward or upward if the edge thereof is pressed to the flange and compressed to thereby reduce the force by which the edge of the magnetic tape is pressed to the flange.

As has been described in the above, the magnetic tape recording/reproducing device of the present invention is capable of accurately position a magnetic tape relative to a magnetic head to thereby improve recording/reproduction characteristics to or from the magnetic tape even when the running direction of the magnetic tape is inverted between the forward and reverse directions.

The magnetic tape recording/reproducing device and the magnetic tape recording/reproducing system of the present invention are capable of improving recording/reproduction characteristics to or from the magnetic tape without causing damage on the edges thereof, which is advantageous in that using a thinned magnetic tape.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIGS. 11A and 11B are schematic drawings for explaining a first guide roller, and FIGS. 11C and 11D are schematic drawings for explaining a second guide roller;

FIG. 13 is a chart for explaining material compositions for the roller portions of individual samples;

DETAILED DESCRIPTION OF THE PREFERRED EMBODIMENTS

Figure 1:
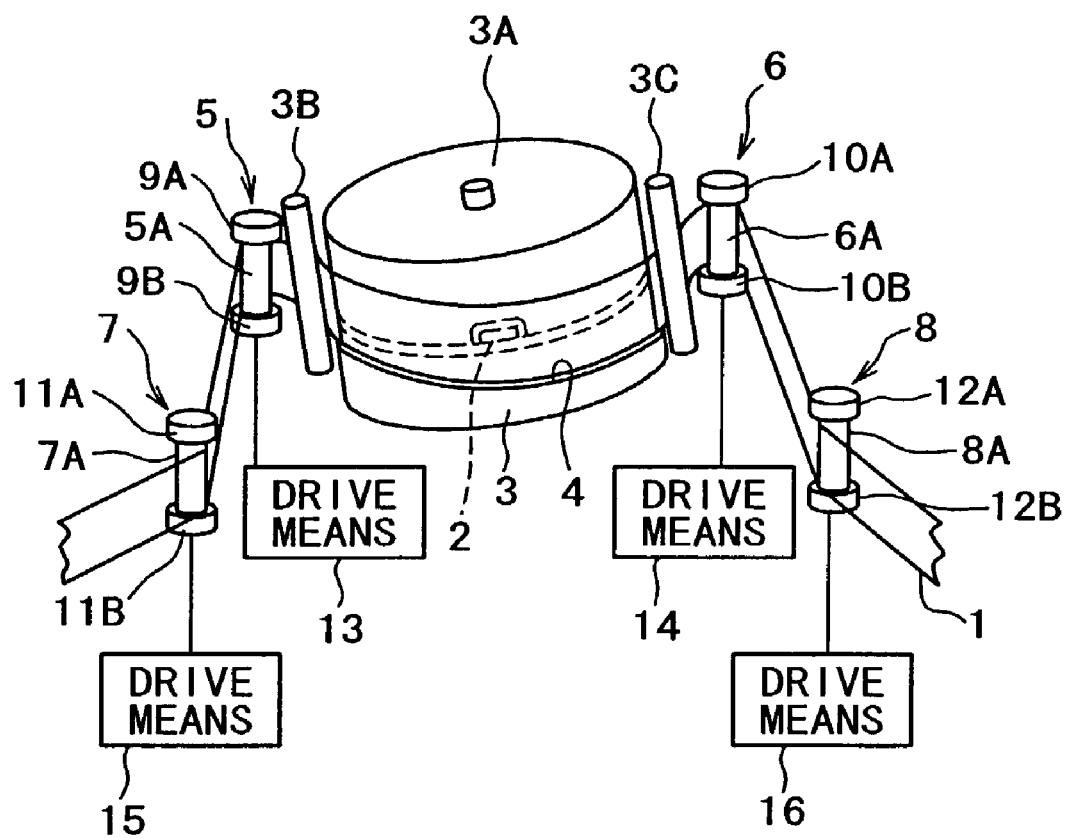
FIG. 1 is a schematic drawing showing a constitution of a magnetic tape recording/reproducing device of a first embodiment of the present invention.

A magnetic tape recording/reproducing device according to a first embodiment of the present invention will be explained referring to the attached drawings. FIG. 1 is a schematic drawing showing a constitution of a magnetic tape recording/reproducing device of the first embodiment.

The magnetic tape recording/reproducing device has a stationary drum 3, a rotary drum 3A installed thereon, and a magnetic head 2 mounted on the rotary drum 3A, where on an outer peripheral surface of the stationary drum 3 a lead 4 for guiding running of the magnetic tape 1 is provided.

The magnetic tape recording/reproducing device is constituted so as to allow the magnetic tape 1 to run both in forward and reverse directions. It is to be noted now that expressions of "upstream side" and "downstream side" of the magnetic tape 1 in the description below are defined for a referential case in which the magnetic tape 1 runs in the forward direction.

On the upstream side and the downstream side along the tape running direction across the rotary drum 3A, stationary guides 3B, 3C for guiding the magnetic tape 1 along the tape running direction towards the magnetic head are provided.

On the upstream side of the stationary guide 3B and on the downstream side of the stationary guide 3C, first guide rollers 5, 6 are respectively provided. The first guide roller 5 comprises a roller portion 5A on which a magnetic tape 1 is partially wound, and flanges 9A, 9B respectively provided on top and bottom portions of the roller potion 5A. The first guide roller 6 comprises a roller portion 6A on which a magnetic tape 1 is partially wound, and flanges 10A, 10B respectively provided on top and bottom portions of the roller potion 6A.

The first guide rollers 5 and 6 are provided so as to swing between a first inclined position and a second inclined position along a tangential direction of the magnetic tape 1 partially wound on the roller portions 5A and 6A, where the first inclined position is such that allowing the upper flanges 9A and 10A to reside on the upstream side of the lower flanges 9B and 10B in the tape running direction, and the second inclined position is such that allowing the upper flanges 9A and 10A to reside on the downstream side of the lower flanges 9B and 10B in the tape running direction.

In other words, the first guide rollers 5, 6 are positioned as being inclined so as to energize the magnetic tape 1 in a direction of the upper edge thereof, and the upper flanges 9A, 10A are arranged so as to contact with the upper edge of the magnetic tape 1 to thereby position the magnetic tape 1 in a width-wise direction.

The first guide rollers 5 and 6 are provided with drive means 13 and 14, respectively, for swinging thereof between the first and second inclined positions.

On the upstream side of the first guide roller 5 and on the downstream side of the first guide roller 6, second guide rollers 7 and 8 are respectively provided.

The second guide roller 7 comprises a roller portion 7A on which a magnetic tape 1 is partially wound, and flanges 11A, 11B respectively provided on top and bottom portions of the roller potion 7A.

The second guide roller 8 comprises a roller portion 8A on which a magnetic tape 1 is partially wound, and flanges 12A, 12B respectively provided on top and bottom portions of the roller potion 8A.

The second guide rollers 7 and 8 are provided so as to swing between a first inclined position and a second inclined position along a tangential direction of the magnetic tape 1 partially wound on the roller portions 7A and 8A, where the first inclined position is such that allowing the lower flanges 11B and 12B to reside on the downstream side of the upper flanges 11A and 12A in the tape running direction, and the second inclined position is such that allowing the lower flanges 11B and 12B to reside on the upstream side of the upper flanges 11A and 12A in the tape running direction.

In other words, the second guide rollers 7, 8 are positioned as being inclined so as to energize the magnetic tape 1 in a direction of lower edge thereof, and the lower flanges 11B, 12B are arranged so as to contact with the lower edge of the magnetic tape 1 to thereby position the magnetic tape 1 in a width-wise direction.

The second guide rollers 7 and 8 are provided with drive means 15 and 16, respectively, for swinging thereof between the first and second inclined positions.

The foregoing drive means 13 to 16 are composed so as to be controlled by control means not shown in the drawing.

Next paragraphs will describe the constitution of the first guide roller in detail.

The first guide roller 5 has an axial portion extending vertically although not shown. The roller portion 5A is supported by the axial portion so as to freely rotatable around it as being coupled with motion of the magnetic tape 1.

Figure 2:
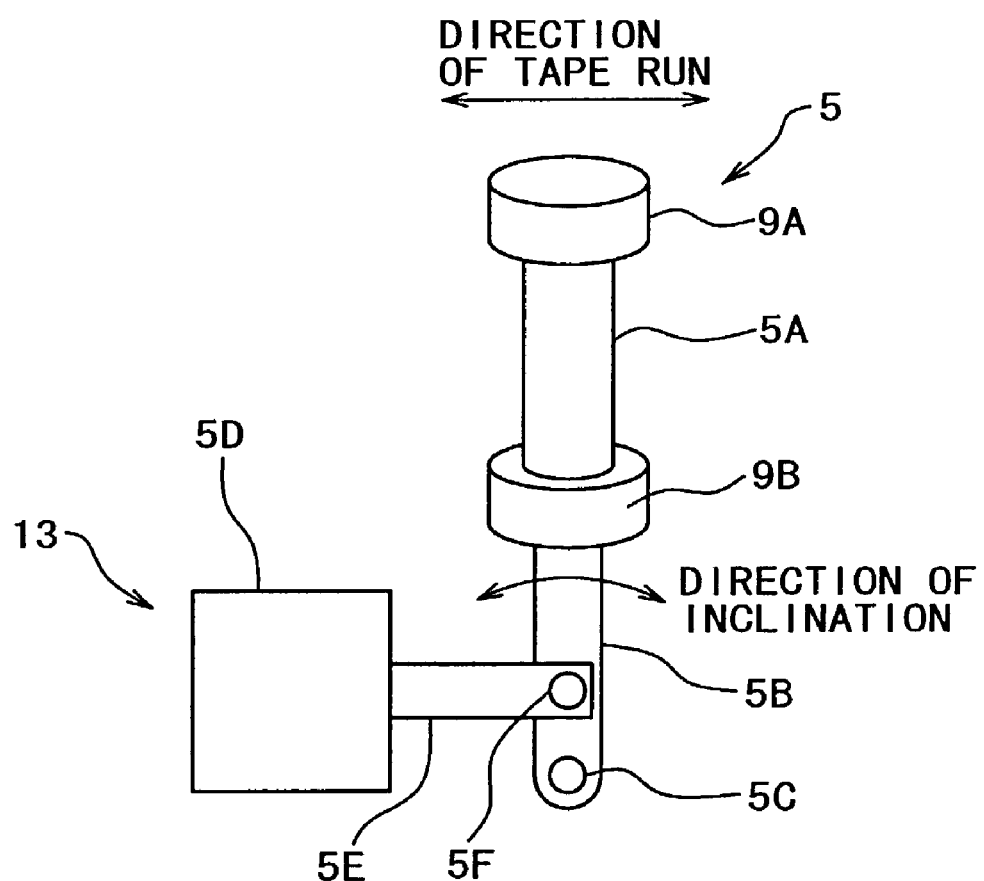
FIG. 2 is a schematic drawing of a constitution of drive means involved in the first embodiment.

As shown in FIG. 2, the flange 9A is provided at the top end of the axial portion so as to come into contact with the upper edge of the magnetic tape 1, and the flange 9B at the bottom end.

The bottom end of the axial portion is linked with a lever 5B, and which lever 5B is supported by a supporting axis 5C so as to be rotatable around it.

Figure 3A:
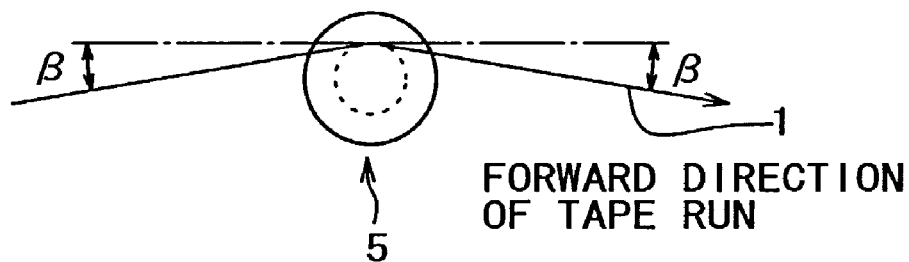
FIG. 3A is a plan view showing a first or second guide roller as viewed from the top.
Figure 3B:
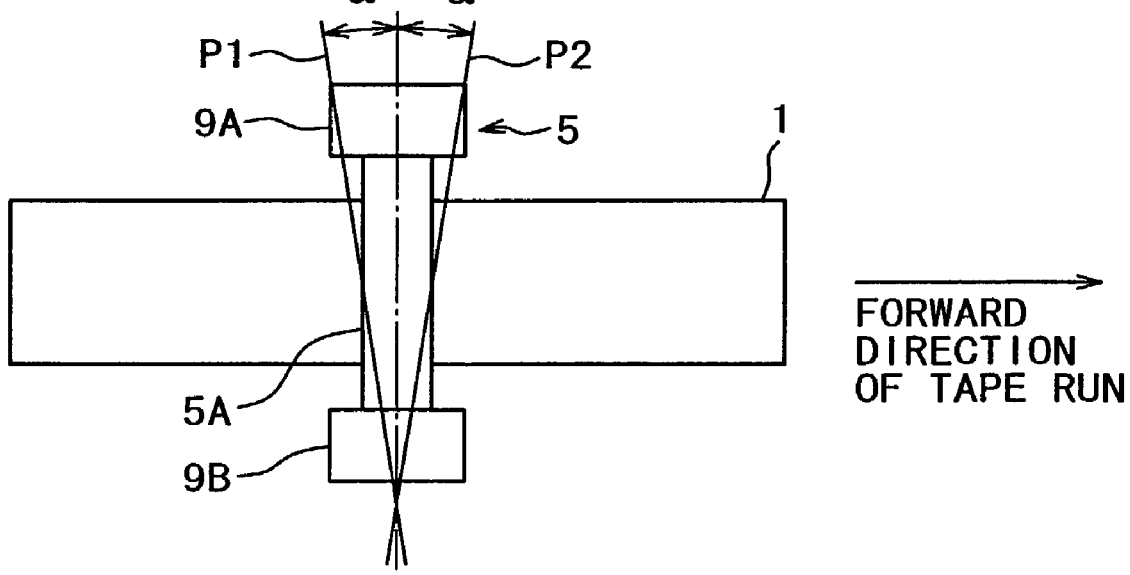
FIG. 3B is a front view of FIG. 3A.

This allows, as shown in FIGS. 3A and 3B, the first guide roller to swing the first inclined position P1 and the second inclined position P2 along the running direction of the magnetic tape 1.

It is to be noted that β in FIG. 3A indicates an angle between the magnetic tape 1 and a tangential line containing a point where the magnetic tape 1 comes into contact with the outer peripheral surface of the roller portion 5A. It is also to be noted that −α and +α in FIG. 3B indicate angles between the neutral position, indicated by a dashed line, of the first guide roller 5 (the position where the axial line of the first guide roller 5 stands normal to the running direction of the magnetic tape 1) and the first and second inclined positions P1 and P2, respectively, to which the first guide roller 5 is swung. The first and second inclined positions P1, P2 of the first guide roller 5 are away from the neutral position by the same absolute value of angle but in different direction.

FIG. 2 shows a pulse motor 5D provided in the vicinity of the lever 5B. The pulse motor 5D is constituted so as to rotate while being controlled based on drive signals sent from the foregoing control means.

To a male screw portion (not shown) provided on the drive axis (not shown) of the pulse motor 5D, a movable member 5E is tightened with a female screw (not shown) so as to be movable as being coupled with rotation of the drive axis.

The movable member 5E is linked to the lever 5B at a midpoint thereon between the supporting axis 5C and the axial portion, whereby the first guide roller 5 is composed so as to incline to the running direction of the magnetic tape as being linked with rotation of the pulse motor 5D while being mediated with the lever 5B and the movable member 5E.

In short, the drive means 13 in the present embodiment comprises the lever 5B, the supporting axis 5C, the pulse motor 5D and the movable member 5E.

The first guide roller 6 is composed similarly to the first guide roller 5, and also the drive means 14 is composed similarly to the drive means 13, so that explanations therefor will be omitted.

The second guide rollers 7, 8 are similar to the first guide rollers 5, 6 except that the flanges 11B, 12B thereof restrict the position of the magnetic tape 1 through making contact with the lower edge thereof, and also the drive means 15, 16 are constituted similarly to the drive means 13, so that details thereof will not be given.

Next paragraphs will describe operations of the device referring to FIGS. 1 to 5.

Figure 4A:
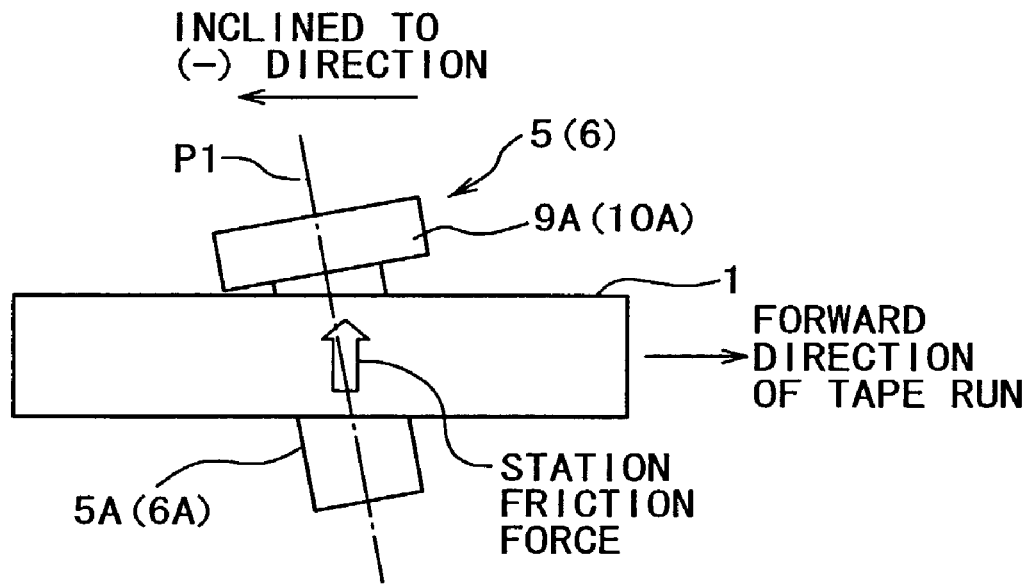
FIG. 4A is a schematic drawing showing a status of a first guide roller inclined to a first inclined position.

When the magnetic tape 1 runs in the forward direction, the control means controls the drive means 13, 14 for the first guide rollers 5, 6 to thereby swing the first guide rollers 5, 6 to the first inclined position P1 as shown in FIG. 4A.

The magnetic tape 1 is thus applied with force along the spirally drifting direction effected through static friction force generated in relation with the outer peripheral surface of the roller portions 5A, 6A of the first guide rollers 5, 6, and is energized towards the direction of the upper edge thereof so as to bring the upper edge into contact with the upper flanges 9A, 10A, which accomplishes the width-wise positioning of the magnetic tape 1.

Figure 5A:
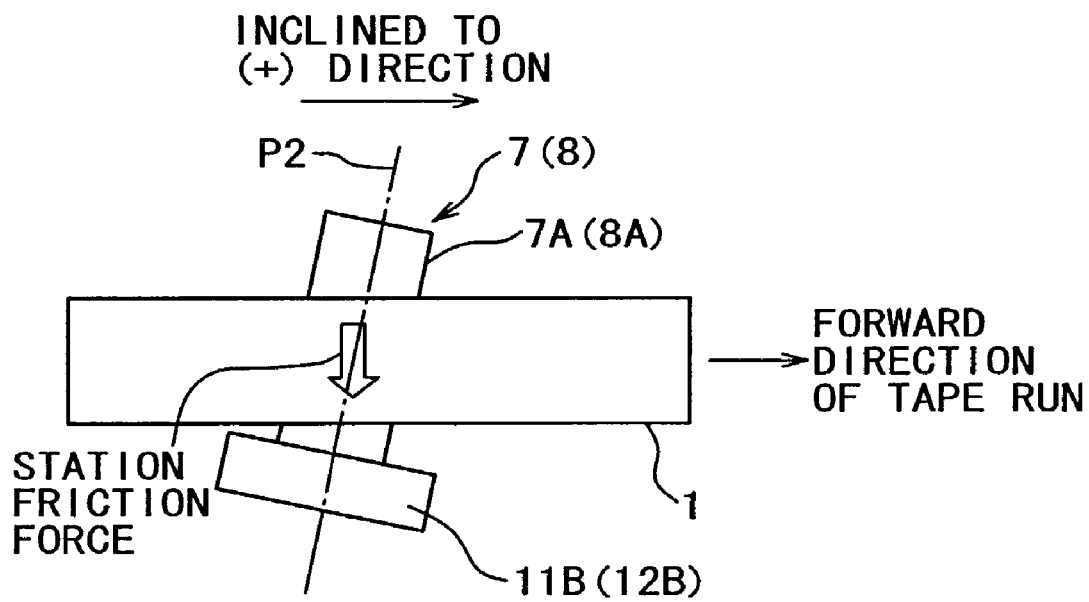
FIG. 5A is a schematic drawing showing a status of a second guide roller inclined to a second inclined position.

The control means also controls the drive means 15, 16 for the second guide rollers 7, 8 to thereby swing the second guide rollers 7, 8 to the second inclined position P2 as shown in FIG. 5A.

The magnetic tape 1 is thus applied with force along the spirally drifting direction effected through static friction force generated in relation with the outer peripheral surface of the roller portions 7A, 8A of the first guide rollers 7, 8, and is energized towards the direction of the lower edge thereof so as to bring the lower edge into contact with the lower flanges 11B, 12B, which accomplishes the width-wise positioning of the magnetic tape 1.

Figure 4B:
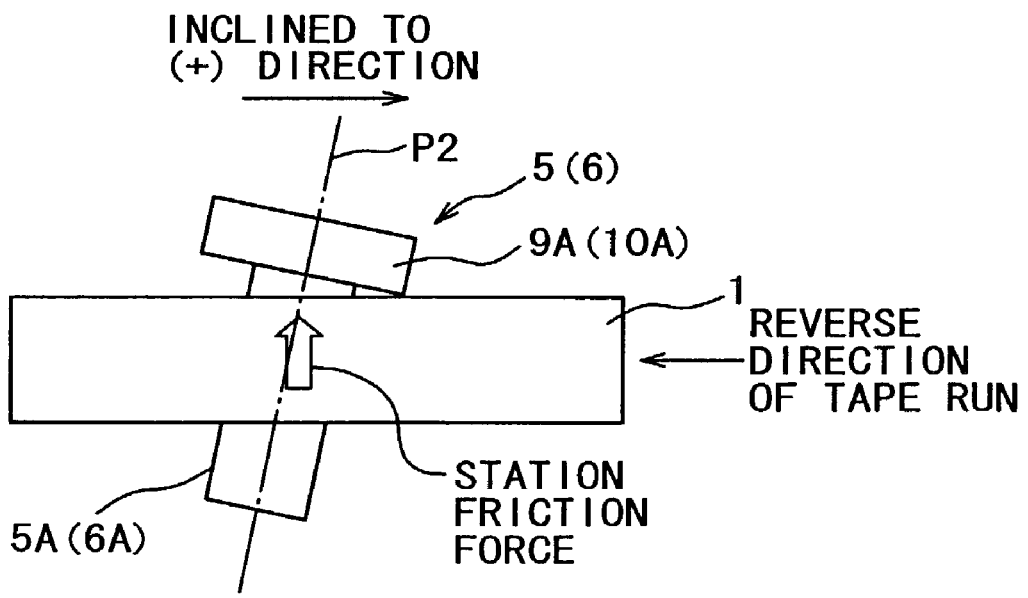
FIG. 4B is a schematic drawing showing a status of a first guide roller inclined to a second inclined position.

When the magnetic tape 1 runs in the reverse direction, the control means controls the drive means 13, 14 for the first guide rollers 5, 6 to thereby swing the first guide rollers 5, 6 to the second inclined position P2 as shown in FIG. 4B.

The magnetic tape 1 is thus applied with force along the spirally drifting direction effected through static friction force generated in relation with the outer peripheral surface of the roller portions 5A, 6A of the first guide rollers 5, 6, and is energized towards the direction of the upper edge thereof so as to bring the upper edge into contact with the upper flanges 9A, 10A, which accomplishes the width-wise positioning of the magnetic tape 1.

Figure 5B:
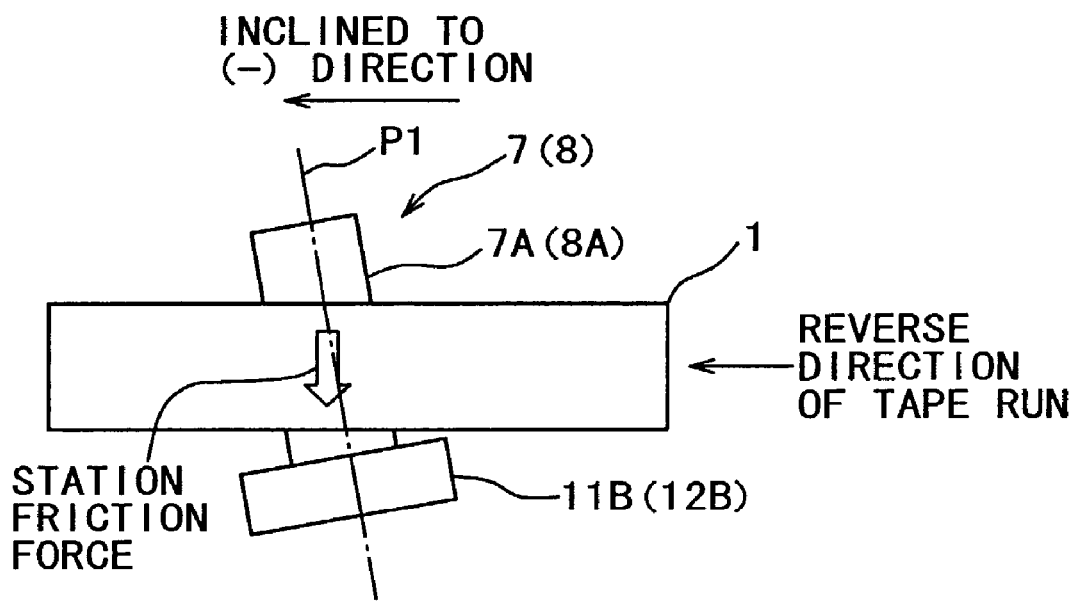
FIG. 5B is a schematic drawing showing a status of a second guide roller inclined to a first inclined position.

The control means also controls the drive means 15, 16 for the second guide rollers 7, 8 to thereby swing the second guide rollers 7, 8 to the first inclined position P1 as shown in FIG. 5B.

The magnetic tape 1 is thus applied with force along the spirally drifting direction effected through static friction force generated in relation with the outer peripheral surface of the roller portions 7A, 8A of the second guide rollers 7, 8, and is energized towards the direction of the lower edge thereof so as to bring the lower edge into contact with the lower flanges 11B, 12B, which accomplishes the width-wise positioning of the magnetic tape 1.

According to the first embodiment, the magnetic tape can correctly be positioned in relation with the magnetic head irrespective of the forward/reverse running direction thereof, which successfully improves recording/reproduction characteristics to or from the magnetic tape.

A second embodiment will be explained next.

The second embodiment differs from the first embodiment in the constitution of the drive means 13 to 16.

Figure 6:
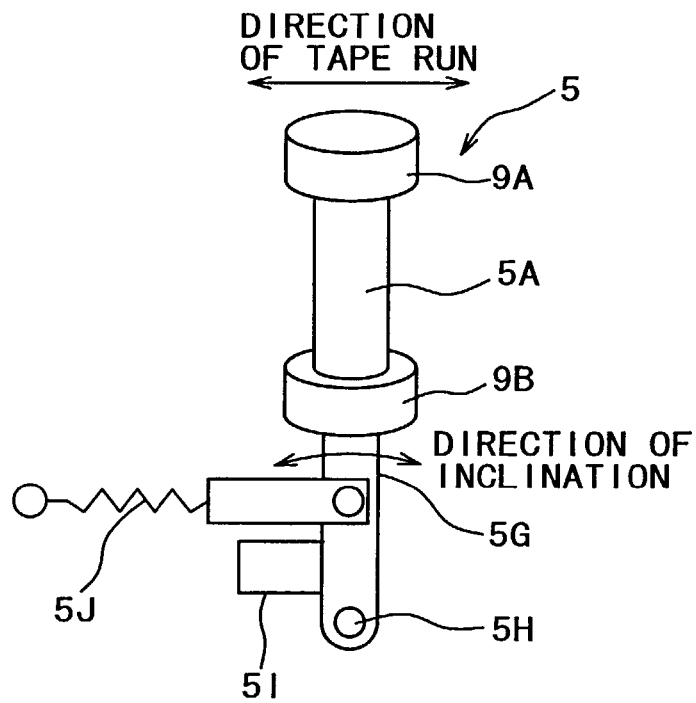
FIG. 6 is a schematic drawing of a constitution of a drive means involved in a second embodiment of the present invention.

FIG. 6 is a schematic drawing showing a constitution of the drive means according to the second embodiment.

As shown in FIG. 6, the bottom end of the axial portion of the first guide roller 5 in the second embodiment is linked to the lever 5G. The lever 5G is supported by a supporting axis 5H so as to be rotatable around it.

A piezoelectric element 5I is provided between a housing (not shown) of the magnetic tape recording/reproducing device and a midpoint on the lever 5G between the supporting axis 5H and axial portion, where the piezoelectric element 5I is constituted so as to generate force caused by piezoelectric effect based on drive signals received from the control means.

Between the housing (not shown) of the magnetic tape recording/reproducing device and the midpoint on the lever 5G between the supporting axis 5H and axial portion, there is provided an energizing member 5J such as a coiled spring. The energizing member 5J urges the lever 5G so as to steadily be brought into contact with the piezoelectric element 5I.

The first guide roller 5 is thus composed so as to swing between the first and second inclined positions P1, P2 as being effected by force generated by the piezoelectric element 5I.

In short, the drive means 13 in the second embodiment comprises the lever 5G, the supporting axis 5H, the piezoelectric element 5I and the energizing member 5J.

The first guide roller 6 is composed similarly to the first guide roller 5, and also the drive means 14 is composed similarly to the drive means 13, so that explanations thereof will be omitted.

The second guide rollers 7, 8 are similar to the first guide rollers 5, 6 except that the flanges 11B, 12B thereof restrict the position of the magnetic tape 1 through making contact with the lower edge thereof, and also the drive means 15, 16 are constituted similarly to the drive means 13, so that details thereof will not be given.

The above-described constitution of the second embodiment can of course exhibit effects similar to those obtained in the first embodiment.

A third embodiment will be explained next.

The third embodiment differs from the first embodiment in the constitution of the drive means 13 to 16.

Figure 7:
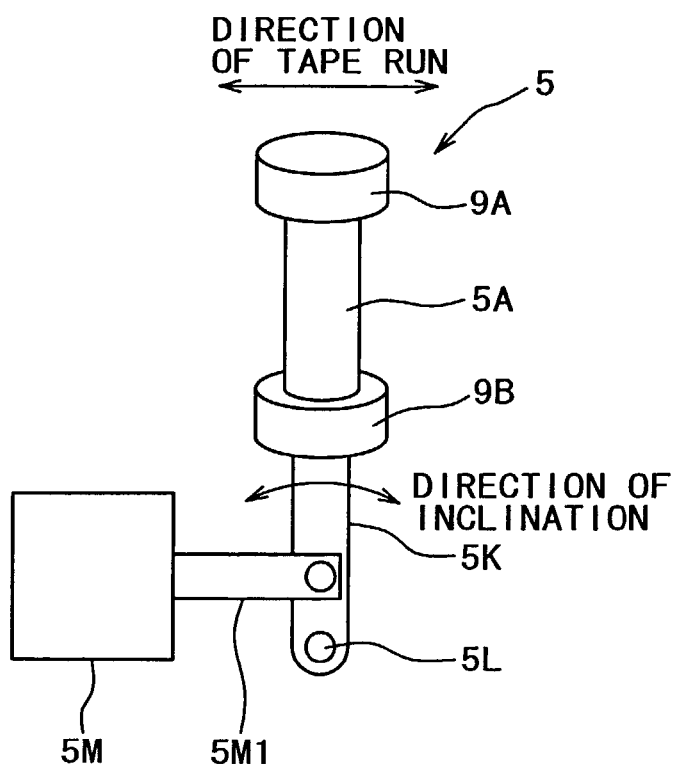
FIG. 7 is a schematic drawing of a constitution of a drive means involved in a third embodiment of the present invention.

FIG. 7 is a schematic drawing showing a constitution of the drive means according to the third embodiment.

As shown in FIG. 7, the bottom end of the axial portion of the first guide roller 5 in the third embodiment is linked to the lever 5K. The lever 5K is supported by a supporting axis 5L so as to be rotatable around it.

A solenoid 5M is provided between a housing (not shown) of the magnetic tape recording/reproducing device and a midpoint on the lever 5K between the supporting axis 5L and axial portion, and a plunger 5M1 of the solenoid 5M is linked to the above-mentioned midpoint on the lever 5K between the supporting axis 5L and axial portion. The solenoid 5M is constituted so as to attract or thrust the plunger 5M1 based on ON/OFF of drive signals received from the control means.

The first guide roller 5 is thus constituted so as to swing between the first and second inclined positions P1, P2 with the aid of the plunger 5M1 which is attracted or thrust in accordance with the ON/OFF operation of the solenoid 5M.

In short, the drive means 13 in the third embodiment comprises the lever 5K, the supporting axis 5L, the plunger 5M1 and the solenoid 5M.

The first guide roller 6 is constituted similarly to the first guide roller 5, and also the drive means 14 is constituted similarly to the drive means 13, so that explanations thereof will be omitted.

The second guide rollers 7, 8 are similar to the first guide rollers 5, 6 except that the flanges 11B, 12B thereof restrict the position of the magnetic tape 1 through making contact with the lower edge thereof, and also the drive means 15, 16 are constituted similarly to the drive means 13, so that details thereof will not be given.

The above-described constitution of the third embodiment can of course exhibit effects similar to those obtained in the first embodiment.

A fourth embodiment will be explained next.

The fourth embodiment differs from the first embodiment in the constitution of the first guide rollers 5, 6 and the second guide rollers 7, 8, and in that the drive means are not provided.

Figure 8A:
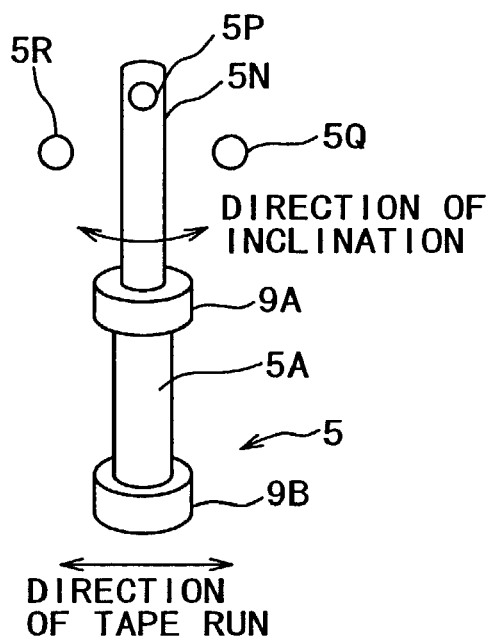
FIG. 8A is a schematic drawing showing a constitution of a first guide roller involved in a fourth embodiment of the present invention.

FIG. 8A is a schematic drawing showing a constitution of the first guide roller according to the fourth embodiment.

As shown in FIG. 8A, the top end of the axial portion of the first guide roller 5 is linked to a lever 5N, and the top end of the lever 5N is supported by a supporting axis 5P so as to be swingable around it.

In the vicinity of the lever 5N, there are provided stoppers 5Q, 5R. Certain portions of the lever 5N come into contact with the stoppers 5Q, 5R so as to be positioned at the first and second inclined positions P1, P2.

When the magnetic tape 1 runs in the forward direction, the first guide roller 5 is swung by the force along the running direction which is applied from the magnetic tape 1 to the outer peripheral surface of the roller portion 5A of the first guide roller 5, and is brought into contact with the stopper 5Q so as to be positioned at the first inclined position P1. On the contrary, when the magnetic tape 1 runs in the reverse direction, the first guide roller 5 is swung by the force along the running direction which is applied from the magnetic tape 1 to the outer peripheral surface of the roller portion 5A of the first guide roller 5, and is brought into contact with the stopper 5R so as to be positioned at the second inclined position P2.

The first guide roller 6 is constituted similarly to the first guide roller 5.

Figure 8B:
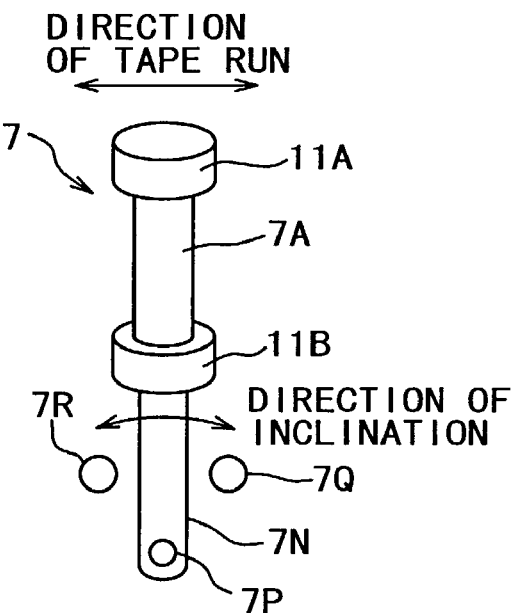
FIG. 8B is a schematic drawing showing a constitution of a second guide roller involved in the fourth embodiment.

FIG. 8B is a schematic drawing showing a constitution of the second guide roller according to the fourth embodiment.

As shown in FIG. 8B, the bottom end of the axial portion of the second guide roller 7 is linked to a lever 7N, and the bottom end of the lever 7N is supported by a supporting axis 7P so as to be swingable around it.

In the vicinity of the lever 7N, there are provided stoppers 7Q, 7R. Certain portions of the lever 7N come into contact with the stoppers 7Q, 7R so as to be positioned at the first and second inclined positions P1, P2.

When the magnetic tape 1 runs in the forward direction, the second guide roller 7 is swung by the force along the running direction which is applied from the magnetic tape 1 to the outer peripheral surface of the roller portion 7A of the second guide roller 7, and is brought into contact with the stopper 7Q so as to be positioned at the first inclined position P1. On the contrary, when the magnetic tape 1 runs in the reverse direction, the second guide roller 7 is swung by the force along the running direction which is applied from the magnetic tape 1 to the outer peripheral surface of the roller portion 7A of the second guide roller 7, and is brought into contact with the stopper 7R so as to be positioned at the second inclined position P2.

The second guide roller 8 is constituted similarly to the second guide roller 7.

The above-described constitution of the fourth embodiment can of course exhibit effects similar to those obtained in the first embodiment.

The fourth embodiment is further advantageous in that achieving cost reduction by virtue of reduced number of parts since the fourth embodiment employs no drive means.

A fifth embodiment will be explained next.

While the first to fourth embodiments describes the magnetic tape recording/reproducing device having the magnetic head 2 mounted on the rotary drum 3A, the present invention is also applicable to a magnetic tape recording/reproducing device having a magnetic head which is fixed relative to the magnetic tape as in the fifth embodiment described below.

The fifth embodiment differs from the first embodiment in that the magnetic head has a stationary-type constitution, and in that none of rotary drum, lead and stationary guides is provided.

Figure 9:
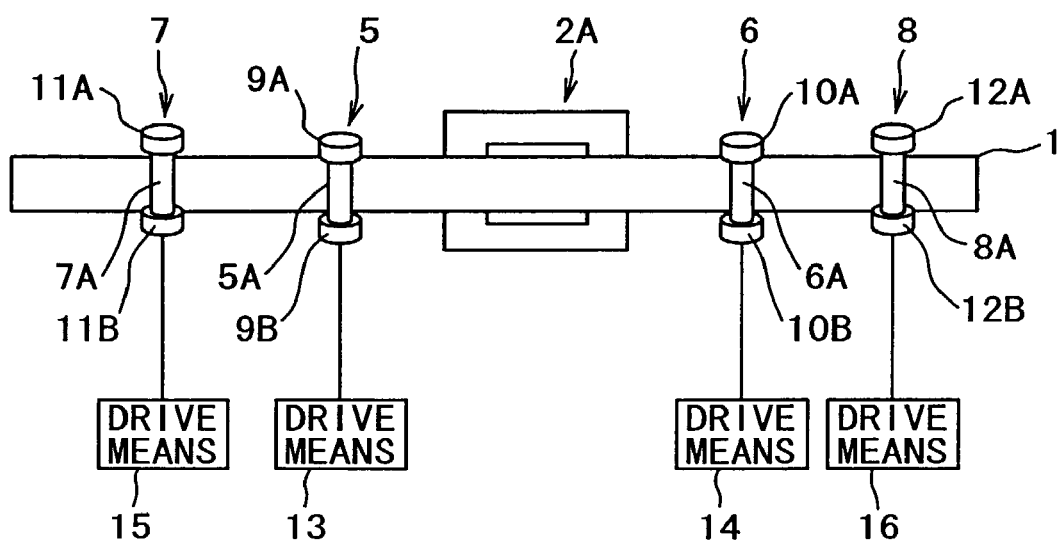
FIG. 9 is a schematic drawing showing a constitution of a magnetic tape recording/reproducing device according to a fifth embodiment of the present invention.

FIG. 9 is a schematic drawing showing a constitution of a magnetic tape recording/reproducing device according to the fifth embodiment As shown in FIG. 9, on the upstream side and the downstream side across a stationary-type magnetic head 2A, a pair of first guide rollers 5 and 6 are respectively provided.

The first guide roller 5 comprises a roller portion 5A on which a magnetic tape 1 is partially wound, and flanges 9A, 9B respectively provided on the top and bottom portions of the roller potion 5A. On the other hand, the first guide roller 6 comprises a roller portion 6A on which the magnetic tape 1 is partially wound, and flanges 10A, 10B respectively provided on the top and bottom portions of the roller potion 6A.

On the upstream side of the first guide roller 5 and on the downstream side of the first guide roller 6, the second guide rollers 7 and 8 are respectively provided.

The second guide roller 7 comprises a roller portion 7A on which the magnetic tape 1 is partially wound, and flanges 11A, 11B respectively provided on the top and bottom portions of the roller potion 7A. On the other hand, the second guide roller 8 comprises a roller portion 8A on which the magnetic tape 1 is partially wound, and flanges 12A, 12B respectively provided on the top and bottom portions of the roller potion 8A.

In the fifth embodiment, the drive means 13 to 16 provided respectively for the first guide rollers 5, 6 and the second guide rollers 7, 8 may be constituted similarly to those described in the first to third embodiments.

The above-described constitution of the fifth embodiment can of course exhibit effects similar to those obtained in the first embodiment.

In the fifth embodiment, it is also allowable to employ a constitution having no drive means similarly to the fourth embodiment, which is further advantageous in that achieving cost reduction by virtue of reduced number of parts.

Next paragraphs will describe a magnetic tape recording/reproducing device and a magnetic tape recording/reproducing system according to the sixth embodiment of the present invention referring to the attached drawings.

Figure 10:
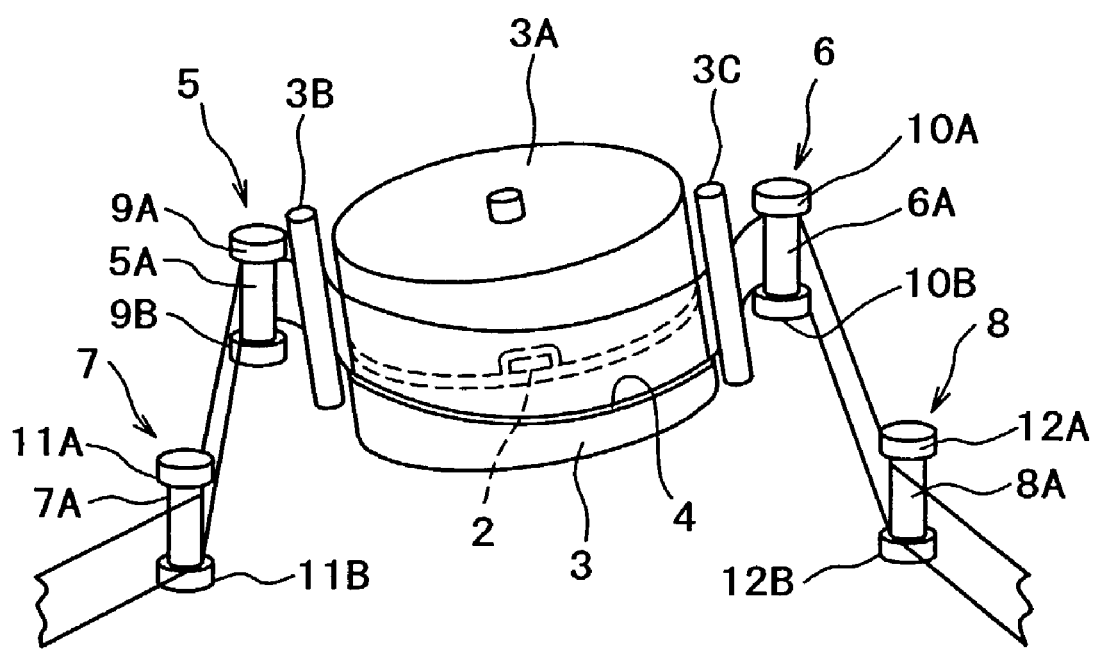
FIG. 10 is a schematic drawing showing a constitution of a magnetic tape recording/reproducing device or a magnetic tape recording/reproducing system according to a sixth embodiment of the present invention.

FIG. 10 is a schematic drawing showing a constitution of a magnetic tape recording/reproducing device or a magnetic tape recording/reproducing system according to the sixth embodiment of the present invention. Note that same reference numerals as those in FIG. 1 are used also in FIG. 10 for the similar parts and portions.

The magnetic tape recording/reproducing device has a stationary drum 3, a rotary drum 3A installed thereon, and a magnetic head 2 mounted on the rotary drum 3A. On the outer peripheral surface of the stationary drum 3, a lead 4 for guiding running of a magnetic tape 1 is provided.

On the upstream side and the downstream side along the running direction of the magnetic tape 1 across the rotary drum 3A, there are provided stationary guides 3B, 3C for guiding the magnetic tape 1 in the tape running direction towards the magnetic head 2.

On the upstream side of the stationary guide 3B and on the downstream side of the stationary guide 3C, first guide rollers 5, 6 are respectively provided.

The first guide roller 5 comprises a roller portion 5A on which the magnetic tape 1 is partially wound, and flanges 9A, 9B respectively provided on the top and bottom portions of the roller potion 5A. On the other hand, the first guide roller 6 comprises a roller portion 6A on which the magnetic tape 1 is partially wound, and flanges 10A, 10B respectively provided on the top and bottom portions of the roller potion 6A.

As shown in FIGS. 11A and 11B, the first guide rollers 5 and 6 are provided as being inclined so that the upper flanges 9A and 10A thereof reside on the upstream side of the lower flanges 9B and 10B along the tangential direction of the magnetic tape 1 partially wound thereon.

That is, the first guide rollers 5, 6 are arranged as being inclined so as to energize the magnetic tape 1 in the direction of the upper edge thereof, and the upper flanges 9A, 10A are arranged so as to contact with the upper edge of the magnetic tape 1 to thereby position the magnetic tape 1 in the width-wise direction.

On the upstream side of the first guide roller 5 and on the downstream side of the first guide roller 6, second guide rollers 7, 8 are respectively provided.

The second guide roller 7 comprises a roller portion 7A on which the magnetic tape 1 is partially wound, and flanges 11A, 11B respectively provided on the top and bottom portions of the roller potion 7A.

On the other hand, the second guide roller 8 comprises a roller portion 8A on which the magnetic tape 1 is partially wound, and flanges 12A, 12B respectively provided on the top and bottom portions of the roller potion 8A.

As shown in FIGS. 11C and 11D, the second guide rollers 7 and 8 are provided as being inclined so that the lower flanges 11B and 12B thereof reside on the upstream side of the upper flanges 11A and 12A along the tangential direction of the magnetic tape 1 partially wound thereon.

That is, the second guide rollers 7, 8 are arranged as being inclined so as to energize the magnetic tape 1 in the direction of lower edge thereof, and the lower flanges 11B, 12B are arranged so as to contact with the lower edge of the magnetic tape 1 to thereby position the magnetic tape 1 in the width-wise direction.

In the sixth embodiment, the roller portions 5A to 8A of the first and second guide rollers 5 to 8 are made of an austenitic stainless steel.

Figure 12A:
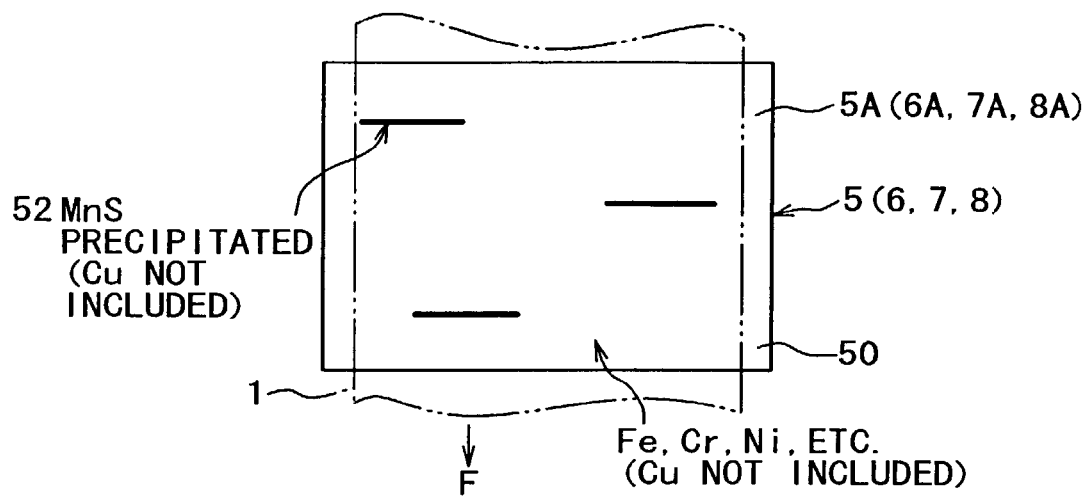
FIG. 12A is a developed chart showing an example of a roller portion of a first or second guide roller.

FIG. 12A shows a developed view showing an example of a roller portion of the first or second guide roller. In the figure, the reference alphabet F represents the running direction of the magnetic tape 1. A case of the first guide roller 5 is herein described as an example.

The roller portion 5A is made of a material 50 comprising an austenitic stainless steel. In the material 50, manganese sulfide (MnS) precipitates to thereby form a manganese sulfide precipitated zone 52 (precipitation zone) so as to expose to the outer surface of the roller portion 5A.

Neither the manganese sulfide precipitated zone 52 nor the residual portion contains copper (Cu).

The manganese sulfide precipitated zone 52 has an improving effect of slipping on the magnetic tape 1, which successfully lowers a static friction coefficient between the outer peripheral surface of the roller portion 5A and the magnetic tape 1 than that between the outer peripheral surface of a roller portion of a conventional guide roller (typically made of an aluminum material) and the magnetic tape 1.

The description is given on the case of the first guide roller 5. However, this applies also to cases of the first guide roller 6 and the second guide rollers 7 and 8.

The above-described constitution can reduce a maximum static friction force generated between the magnetic tape 1 and the outer peripheral surface of the roller portion. This makes it easier for the magnetic tape 1 to slip on the outer peripheral surface of the roller portion, so that the magnetic tape 1 is more likely to be pushed back downward or upward even if the edge thereof is compressed as being pushed to the flange 9A, 10A, 11B or 12B.

Since the constitution can desirably reduce the force by which the edge of the magnetic tape 1 is pressed to the flange 9A, 10A, 11B or 12B, damage on the edge will be avoidable, and accuracy in positioning of the magnetic tape will be kept at a desirable level. This is advantageous in stabilizing the tracking and thus ensuring an excellent S/N ratio, an in allowing use of thinned magnetic tapes (typically those having a thickness of 5 μm or below).

Austenitic stainless steel available for constituting the first and second guide rollers 5 to 8 also includes materials described below.

Figure 12B:
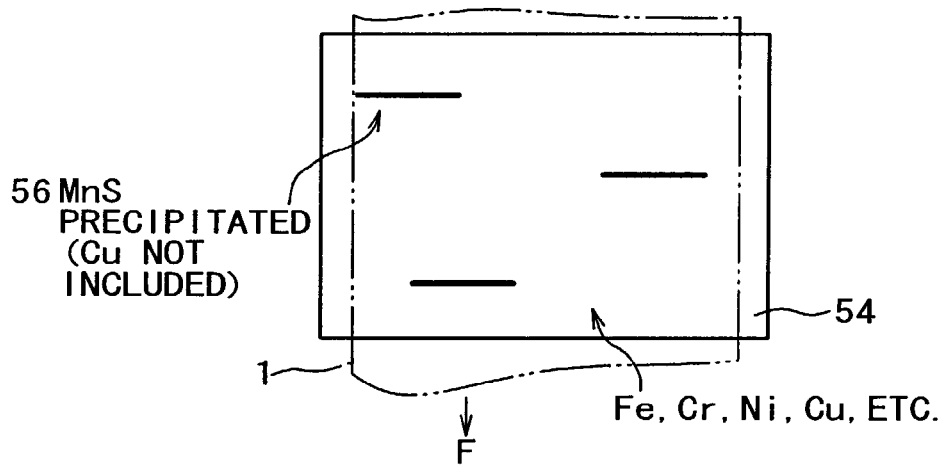
FIG. 12B is a developed chart showing another example of a roller portion of a first or second guide roller.

FIG. 12B is a developed view showing another example of a roller portion of the first or second guide roller.

The roller portion 5A is made of a material 54 comprising an austenitic stainless steel. In the material 54, manganese sulfide (MnS) precipitates to thereby form a manganese sulfide precipitated zone 56 (precipitation zone) so as to expose to the outer surface of the roller portion 5A.

While the manganese sulfide precipitated zone 56 does not contain copper (Cu), the residual portion other than the manganese sulfide precipitated zone 56 contains copper (Cu).

Similarly to the case shown in FIG. 12A, the manganese sulfide precipitated zone 56 also has an improving effect of slipping on the magnetic tape 1, which successfully lowers a static friction coefficient between the outer peripheral surface of the roller portion 5A and the magnetic tape 1 than that between the outer peripheral surface of a roller portion of a conventional guide roller (typically made of an aluminum material) and the magnetic tape 1, which ensures effects similarly to those obtained in the case shown in FIG. 12A.

Figure 12C:
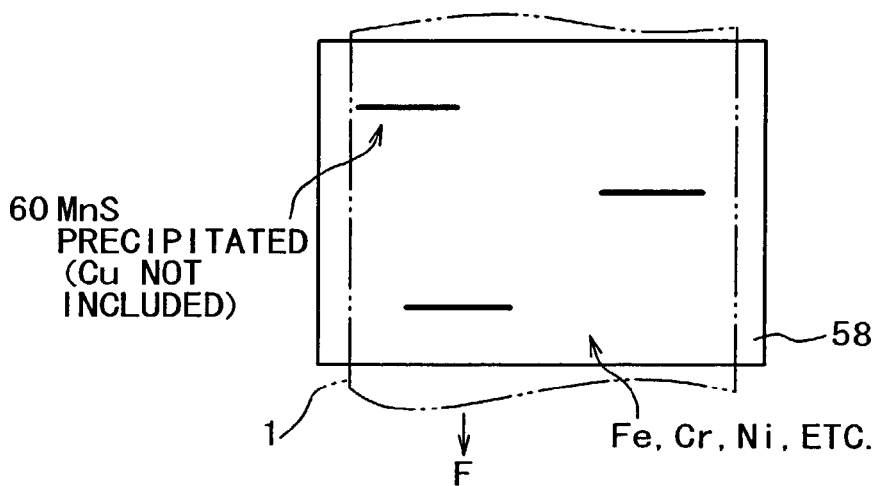
FIG. 12C is a still another example of a roller portion of a first or second guide roller.

FIG. 12C is a developed view showing still another example of a roller portion of the first or second guide roller.

The roller portion 5A is made of a material 58 comprising an austenitic stainless steel. In the material 58, manganese sulfide (MnS) precipitates to thereby form a manganese sulfide precipitated zone 60 (precipitation zone) so as to expose to the outer surface of the roller portion 5A.

While the manganese sulfide precipitated zone 60 contains copper (Cu), the residual portion other than the manganese sulfide precipitated zone 56 does not contain copper (Cu).

Similarly to the cases shown in FIGS. 12A and 12B, the manganese sulfide precipitated zone 60 also has an improving effect of slipping on the magnetic tape 1, which successfully lowers a static friction coefficient between the outer peripheral surface of the roller portion 5A and the magnetic tape 1 than that between the outer peripheral surface of a roller portion of a conventional guide roller (typically made of an aluminum material) and the magnetic tape 1, which ensures effects similarly to those obtained in the case shown in FIG. 12A.

The present inventors conducted experiments for measuring static friction coefficients based on various combinations of materials for composing the roller portions of the first and second guide rollers and surface finishing conditions for the magnetic tape, and for measuring generation frequency of tracking error using a practical magnetic tape recording/reproducing device.

FIG. 13 is a chart for explaining material compositions for the roller portions of the individual samples.

The samples "A" to "C" are composed of the materials shown in FIGS. 12A to 12C, respectively. The sample "D" corresponds to a conventional example, and is composed of an aluminum alloy material.

Samples of the magnetic tape 1 employed herein are as follows:

Sample 1: 5 μm thick, surface coated with a fluorine-containing lubricant in a thickness of 5 nm; and Sample 2: 5 μm thick, surface coated with a fluorine-containing lubricant in a thickness of 15 nm.

Figure 14:
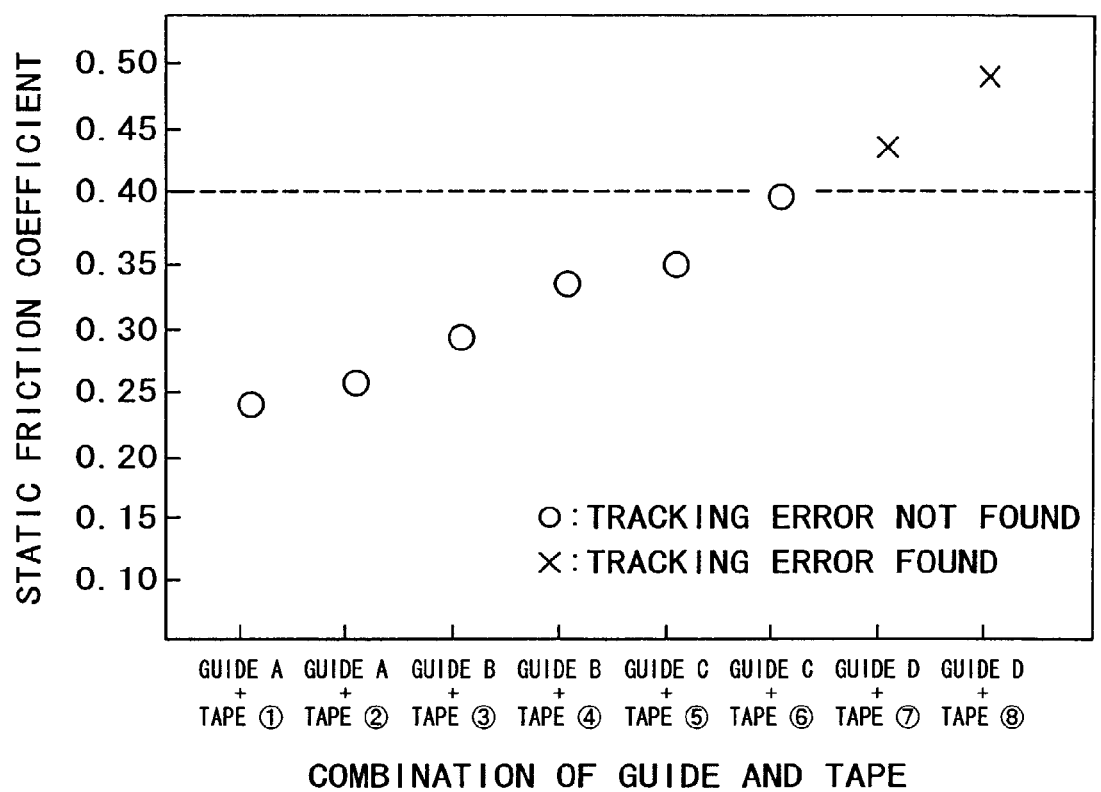
FIG. 14 is a chart showing experimental results.

FIG. 14 is a chart showing experimental results, where the abscissa represents combinations of the samples "A" to "D" for the roller portions and the samples 1 and 2 for the magnetic tape, and the ordinate represents static friction coefficient. Symbol represents that no tracking error was found, and symbol x represents that tracking error was found.

It is clear from the experimental results shown in FIG. 14 that a static friction coefficient was found to be approx. 0.25, which is lowest of all, for the sample "A"; 0.3 to 0.35 for the sample "B"; and 0.35 to 0.4 for the sample "C". This proves that use of any of the samples "A", "B" or "C" was not causative of tracking error irrespective of thickness of the coated lubricant. On the contrary, the sample "D" using the conventional aluminum-base material showed a static friction coefficient of as high as 0.45 to 0.5, which indicates occurrence of the tracking error.

From these results, it was confirmed that, according to the sixth embodiment, the tracking error is successfully avoidable if the static friction coefficient is suppressed to 0.4 or below even if the thickness of the magnetic tape 1 is as thin as 5 μm or below.

A seventh embodiment will be explained next.

While the foregoing sixth embodiment dealt with the magnetic tape recording/reproducing device having the magnetic head 2 mounted on the rotary drum 3A, the present invention is also applicable to a stationary-type magnetic tape recording/reproducing device and magnetic tape recording/reproducing system having the magnetic head fixed relative to the magnetic tape as in the seventh embodiment explained below.

The seventh embodiment differs from the sixth embodiment in that the magnetic head has a stationary-type constitution, and in that none of rotary drum, lead and stationary guide is provided.

Figure 15:
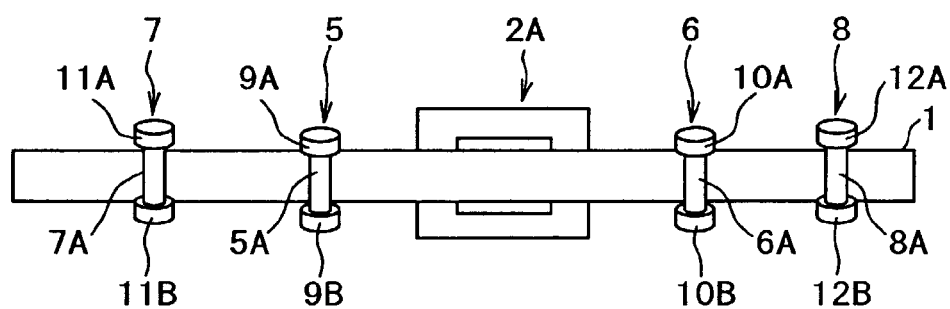
FIG. 15 is a schematic drawing for explaining a constitution of a magnetic tape recording/reproducing device or a magnetic tape recording/reproducing system according to a seventh embodiment of the present invention.
Figure 16:
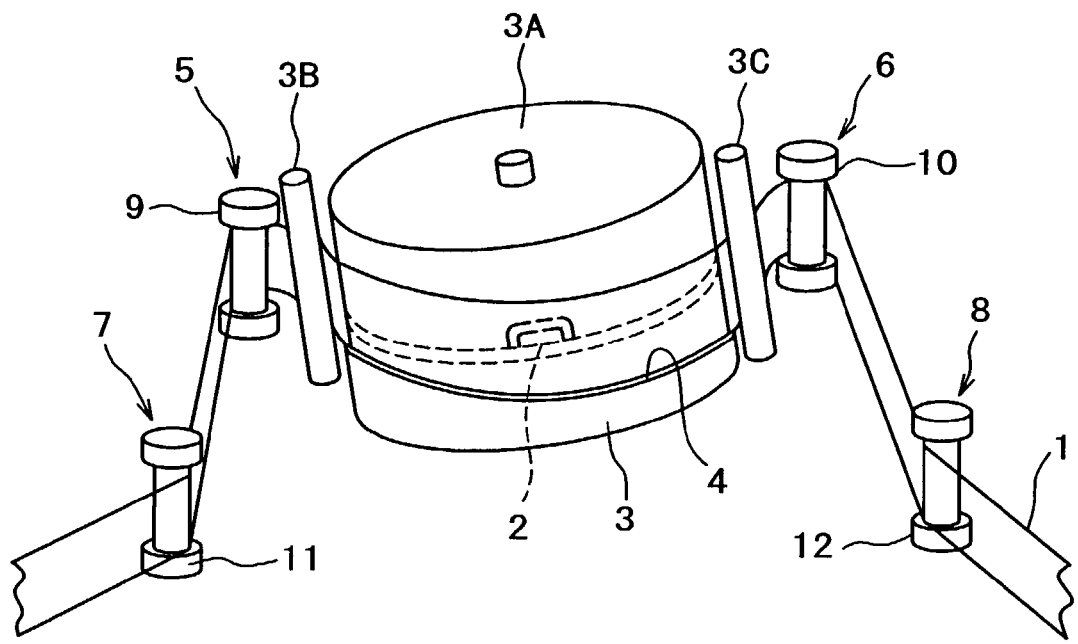
FIG. 16 is a schematic drawing showing a constitution of a conventional magnetic tape recording/reproducing device having a rotary head.
Figure 17A:
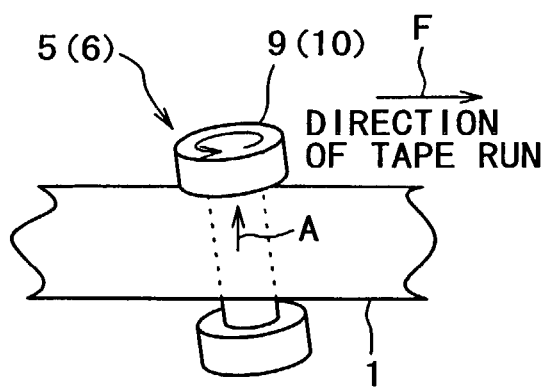
FIG. 17A is a schematic drawing for explaining a first guide roller and FIG. 17B is a schematic drawing for explaining a second guide roller.
Figure 17B:
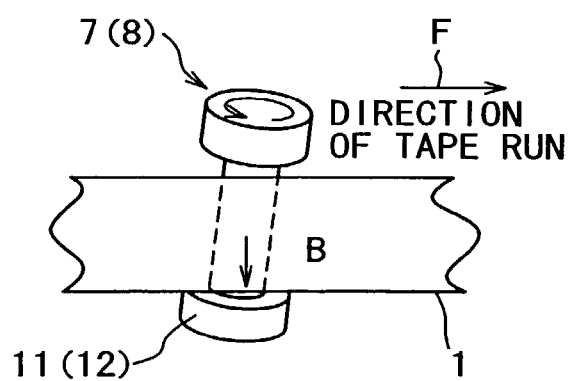
Figure 18A:
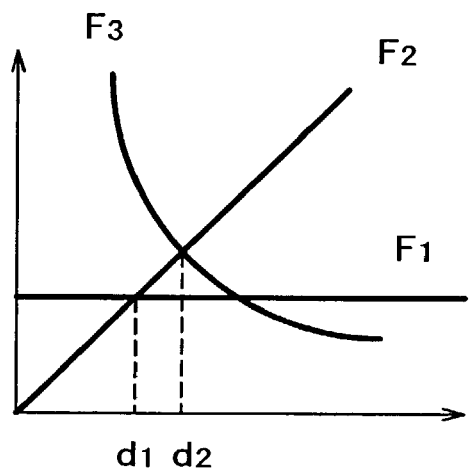
FIG. 18A is a graph for explaining a case in which compressive force comes short of buckling strength of a magnetic tape.
Figure 18B:
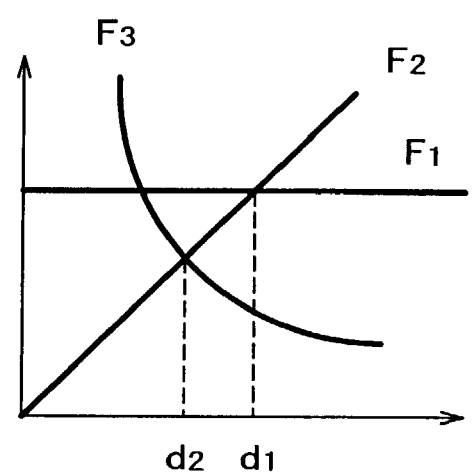
FIG. 18B is a graph for explaining a case in which compressive force exceeds buckling strength of a magnetic tape.

FIG. 15 is a schematic drawing for explaining a constitution of a magnetic tape recording/reproducing device or a magnetic tape recording/reproducing system according to the seventh embodiment.

As shown in FIG. 15, on the upstream side and downstream side across the stationary-type magnetic head 2A the first guide rollers 5 and 6 are respectively provided.

The first guide roller 5 comprises a roller portion 5A and flanges 9A, 9B respectively provided on the top and bottom portions of the roller potion 5A. The first guide roller 6 comprises a roller portion 6A and flanges 10A, 10B respectively provided on the top and bottom portions of the roller potion 6A.

On the upstream side of the first guide roller 5 and on the downstream side of the first guide roller 6, the second guide rollers 7 and 8 are respectively provided.

The second guide roller 7 comprises a roller portion 7A and flanges 11A, 11B respectively provided on the top and bottom portions of the roller potion 7A.

The second guide roller 8 comprises a roller portion 8A and flanges 12A, 12B respectively provided on the top and bottom portions of the roller potion 8A.

As in the sixth embodiment, the roller portions 5A to 8A of the first and second guide rollers 5 to 8 are made of an austenitic stainless steel.

The above-described constitution of the seventh embodiment can of course exhibit effects similar to those obtained in the sixth embodiment.

What is claimed is:

1. A magnetic tape recording/reproducing device comprising:
    (a) a magnetic head for effecting recording and/or reproduction to or from a magnetic tape; and
    (b) a pair of guide rollers for guiding the magnetic tape partially wound thereon, which are respectively provided on an upstream side and a downstream side along a tape running direction placing the magnetic head in between, wherein:
    each of said guide rollers comprises:
    (b-1) a roller portion which is in contact with and rotates with motion of the magnetic tape; and
    wherein
    said guide roller swings between a first inclined position for a first direction of tape travel and a second inclined position for a second direction of tape travel.

2. The magnetic tape recording/reproducing device as claimed in claim 1, further comprising drive means for swinging said guide rollers towards the first and second inclined positions,
    wherein the swinging of said guide rollers towards the first and second inclined positions is effected by said drive means as being linked with the direction of tape travel.

3. The magnetic tape recording/reproducing device as claimed in claim 1, wherein said drive means further comprises a solenoid for moving a plunger, and the swinging of the guide rollers by said drive means is effected by said plunger.

4. The magnetic tape recording/reproducing device as claimed in claim 1, wherein said drive means further comprises a motor, and the swinging of the guide rollers by said drive means is effected by a rotational driving force of said motor.

5. The magnetic tape recording/reproducing device as claimed in claim 2, wherein said drive means further comprises a piezoelectric element, and the swinging of the guide rollers by said drive means is effected by a force generated in said piezoelectric element.

6. The magnetic tape recording/reproducing device as claimed in claim 2, wherein the swinging of said guide rollers towards the first and second inclined positions is effected by a force exerted from the magnetic tape to said guide rollers.

7. The magnetic tape recording/reproducing device as claimed in claim 2, wherein each guide rollers further comprises a first guide roller and a second guide roller,
    said first guide roller being located so as to position one edge of the magnetic tape,
    said second guide roller being located so as to position the other edge of the magnetic tape, and
    the swinging of said guide rollers is effected so that the directions of inclination of said first and second guide rollers are inverted with respect to each other.

8. The magnetic tape recording/reproducing device as claimed in claim 1, further comprising a stationary drum and a rotary drum installed on an upper portion of said stationary drum, wherein said magnetic head is mounted on an outer peripheral surface of said rotary drum.

9. The magnetic tape recording/reproducing device as claimed in claim 1, wherein said magnetic head is a stationary-type magnetic head having a position thereof fixed relative to the magnetic tape.

10. A magnetic tape recording/reproducing device comprising:
    (a) a magnetic head for effecting recording and/or reproduction to or from a magnetic tape; and
    (b) a pair of guide rollers for guiding the magnetic tape partially wound thereon, which are respectively provided on an upstream side and a downstream side along a tape running direction placing the magnetic head in between, wherein:
    each of said guide rollers comprises:
    (b-1) a roller portion which is in contact with and rotates with the motion of the magnetic tape; and
    wherein
    said guide roller is provided so as to be inclined along a tangential direction of the magnetic tape partially wound on said roller portion, and
    said guide roller being composed so as to have a static friction coefficient with the magnetic tape of 0.4 or below.

11. The magnetic tape recording/reproducing device as claimed in claim 10, wherein the magnetic tape has a thickness of 5 μm or below.

12. The magnetic tape recording/reproducing device as claimed in claim 10, wherein each of said guide rollers further comprises a first guide roller and a second guide roller,
    said first guide roller being inclined from the tape running direction so as to position one edge of the magnetic tape, and
    said second guide roller being inclined from the tape running direction in a direction opposite to the inclination of said first guide roller so as to position the other edge of the magnetic tape.

13. The magnetic tape recording/reproducing device as claimed in claim 10, wherein a material composing said roller portion is stainless steel.

14. The magnetic tape recording/reproducing device as claimed in claim 10, wherein a material composing said roller portion is austenitic stainless steel.

15. The magnetic tape recording/reproducing device as claimed in claim 10, wherein a material composing said roller portion is austenitic stainless steel having a precipitated zone containing MnS precipitated therein.

16. The magnetic tape recording/reproducing device as claimed in claim 15, wherein both of the precipitated zone and a residual portion are free from copper (Cu).

17. The magnetic tape recording/reproducing device as claimed in claim 15, wherein the precipitated zone is free from copper (Cu) and a residual portion contains copper (Cu).

18. The magnetic tape recording/reproducing device as claimed in claim 15, wherein the precipitated zone contains (Cu) and a residual portion is free from copper (Cu).

19. The magnetic tape recording/reproducing system as claimed in claim 10, wherein each guide roller further comprises a first guide roller and a second guide roller,
    said first guide roller being inclined from the tape running direction so as to position one edge of said magnetic tape, and
    said second guide roller being inclined from the tape running direction in a direction opposite to the inclination of said first guide roller so as to position the other edge of said magnetic tape.

20. A magnetic tape recording/reproducing system comprising a magnetic tape and a magnetic tape recording/reproducing device,
    said magnetic tape recording/reproducing device comprising:
    (a) a magnetic head for effecting recording and/or reproduction to or from a magnetic tape; and
    (b) at least one guide roller
    which is in contact with and rotates with the motion of the magnetic tape; and
    wherein
    said guide roller is provided so as to be inclined along a tangential direction of the magnetic tape partially wound on said roller portion, and
    said guide roller being composed so as to have a static friction coefficient with the magnetic tape of 0.4 or below.

21. The magnetic tape recording/reproducing system as claimed in claim 20, wherein said magnetic tape has a thickness of 5 μm or below.

22. The magnetic tape recording/reproducing device as claimed in claim 20, wherein a material composing said roller portion is stainless steel.

23. The magnetic tape recording/reproducing device as claimed in claim 20, wherein a material composing said roller portion is austenitic stainless steel.

24. The magnetic tape recording/reproducing device as claimed in claim 20, wherein a material composing said roller portion is austenitic stainless steel having a precipitated zone containing MnS precipitated therein.

25. The magnetic tape recording/reproducing device as claimed in claim 24, wherein both of the precipitated zone and a residual portion are free from copper (Cu).

26. The magnetic tape recording/reproducing device as claimed in claim 24, wherein the precipitated zone is free from copper (Cu) and a residual portion contains copper (Cu).

27. The magnetic tape recording/reproducing device as claimed in claim 24, wherein the precipitated zone contains (Cu) and a residual portion is free from copper (Cu).

28. A magnetic tape recording/reproducing device comprising:
    a magnetic head for effecting recording and/or reproduction to or from a magnetic tape; and
    at least one guide roller which is in contact with and rotates with motion of the magnetic tape wherein the guide roller moves between a first inclined position for a first direction of tape travel and a second inclined position for a second direction of tape travel.

* * * * *